United States Patent [19]

Babikyan

[11] 4,208,736
[45] Jun. 17, 1980

[54] HYDROPHONE HAVING A PLURALITY OF DIRECTIONAL OUTPUTS

[75] Inventor: Jirair A. Babikyan, Woburn, Mass.

[73] Assignee: Sanders Associates, Inc., Nashua, N.H.

[21] Appl. No.: 115,366

[22] Filed: Feb. 16, 1971

[51] Int. Cl.² ............................................. H04R 11/00
[52] U.S. Cl. .................................. 367/153; 367/173; 367/175
[58] Field of Search ..................... 340/8, 11, 13, 12; 367/153, 173, 174, 175

[56] References Cited

U.S. PATENT DOCUMENTS

| | | | |
|---|---|---|---|
| 2,435,587 | 2/1948 | Harry | 340/11 |
| 3,665,381 | 5/1972 | Bauer | 340/8 |

Primary Examiner—Harold J. Tudor

Attorney, Agent, or Firm—Louis Etlinger; Richard I. Seligman

[57] ABSTRACT

A directional hydrophone comprises a plurality of coil elements each disposed in an air gap in a common magnetic circuit. In a first embodiment of the invention two coil elements each have a single degree of freedom of motion which is orthogonal to the other. The force due to an acoustic wave impingent upon the hydrophone is resolved into two orthogonal components by the two coils which give rise to two distinct electrical output signals proportional to the sine and cosine respectively of the angle at which the acoustic wave arrives. In another embodiment of the invention each coil element has two degrees of freedom of motion and the movement of each of the coil elements is resolved into two orthogonal components by the effective length of the coil which varies in a known manner with the angle of coil motion with respect to the polarity of the magnetic circuit.

14 Claims, 10 Drawing Figures

HYDROPHONE HAVING A PLURALITY OF DIRECTIONAL OUTPUTS

FIELD OF THE INVENTION

The present invention relates generally to the field of acoustic detection and more specifically to a new and improved hydrophone having a plurality of directional outputs in response to an acoustic wave impingent thereon.

DESCRIPTION OF THE PRIOR ART

Prior to the present invention, when it was desired to determine the direction of an underwater sound source, at least two orthogonally oriented single degree of freedom directional hydrophones were required in order to provide two orthogonal output signals proportional to the north-south and east-west components of acoustic waves incident thereon and representative of the sine and cosine of the angle of arrival of the acoustic wave. The two hydrophones were generally placed in an oil filled bottle and carefully aligned such that their axes were orthogonal. A number of drawbacks attend this approach to directional acoustic detection; first, the requirement of two hydrophones each having its own magnetic circuit results in an assembly which is unduly large, heavy and expensive; second, the required use of oil in the hydrophone container is an undesirable contribution to the overall weight of the assembly; third, the alignment of the individual hydrophones such that their axes are orthogonal is a tedious and expensive process; and fourth, any motion of the hydrophones relative to one another is a source of electrical noise. A still further problem arose in that by using two individual hydrophones it was necessary to carefully select pairs of hydrophones with matching characteristics in order to prevent the introduction of errors due to sensitivity variations.

OBJECTS AND SUMMARY OF THE INVENTION

It is therefore a primary object of the present invention to provide a bidirectional hydrophone having two degrees of freedom of motion.

it is another object of the present invention to provide apparatus of the above described character which is of reduced size and weight.

It is a further object of the present invention to provide apparatus of the above described character which is of simplified construction.

It is an additional object of the present invention to provide apparatus of the above described character having a self contained magnetic circuit.

It is also an object of the present invention to provide apparatus of the above described character which is operable in air rather than oil.

It is yet another object of the present invention to provide apparatus of the above described character whereby selection of individual hydrophones having matched characteristics is eliminated.

It is a still further object of the present invention to provide apparatus of the aove described character which eliminates complex alignment requirements.

It is yet an additional object of the present invention to provide apparatus of the above described character wherein noise due to relative motion of individual hydrophones is eliminated.

The foregoing as well as other objectives are achieved by providing a plurality of coils, each disposed in a separate air gap in a magnetic circuit. In an illustrative embodiment two ring type ceramic magnets are magnetized axially and oriented with their poles rotated ninety degrees with respect to one another. Each coil is disposed in an air gap between one magnet and a flux return path and the two coils have orthogonal single degrees of freedom of motion. Thus when an acoustic wave is impingent upon this assembly the force exerted on the coils is resolved into orthogonal coil motion components and two orthogonal i.e. sine and cosine, electrical output signals are produced. In an alternative embodiment each coil is suspended in its respective air gap by a resilient material which permits the coils to move in the direction of the acoustic wave. Orthogonal output signals are produced since the effective voltage generating length of each coil is a sinusoidal function of the angle between the coil direction of motion and the magnet orientation. In another embodiment of the invention both coils may be disposed in a single air gap between two axially magnetized ring type magnets.

The above as well as other objects, features and advantages of the present invention will become more apparent from the following detailed description taken in conjunction with the appended drawings.

DESCRIPTION OF PREFERRED EMBODIMENT

Figure 1:
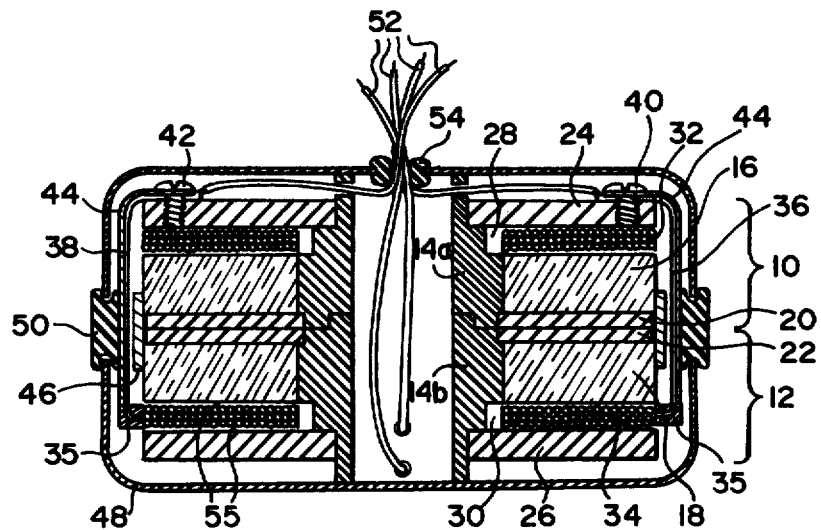
FIG. 1 is a schematic cross sectional view of one embodiment of the present invention having two single degree of freedom coils.
Figure 7:
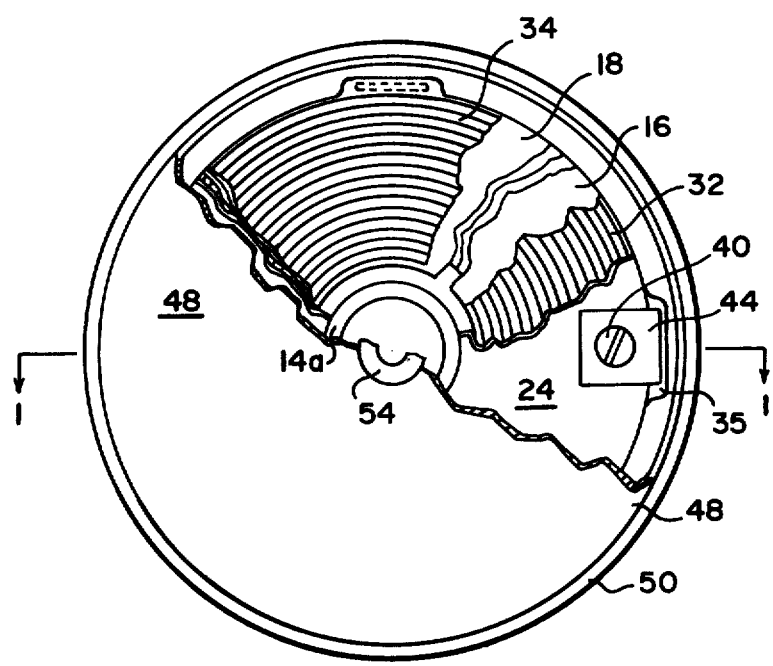
FIG. 7 is a general plan view of the invention with sections cut away.

Turning now to FIG. 1 there is schematically illustrated a cross section view taken along the lines 1—1 of FIG. 7 of a bidirectional hydrophone fabricated in accordance with the principles of the present invention. The hydrophone is preferably fabricated in two sections 10 and 12 for reasons which will be more fully discussed hereinbelow. A center arbor 14 made up of two sections 14a and 14b machined from a non-magnetic material such as aluminum provides a means for mounting the hydrophone components relative to one another. A pair of ring type ceramic magnets 16 and 18 made of a sintered material such as INDOX V which is available from the Indiana General Co. are magnetized axially, such that one half of the circular flat area of each ring is a north pole and the other half is a south pole. The magnets are coaxially disposed on the center arbor 14 and are separated by a ring of magnetic material such as soft iron in which magnetic flux may undergo a change in direction. The soft iron ring is also formed in two pieces 20 and 22 such that final assembly is facilitated as will be discussed hereinbelow. Two magnetic flux return means 24 and 26 are disposed on the center arbor halves 14a and 14b respectively and relative to the magnets 16 and 18 such as to provide first and second air gaps 28 and 30 respectively. First and second coils 32 and 34 are disposed in the air gaps 28 and 30, each having a single degree of freedom which is othogonal to the other. Coil 34 is mounted by single degree of freedom springs 36 and 38 which may be imbedded in the coil potting compound 35 such that the coil is free to move only from left to right in the air gap 30. Coil 32 is also mounted by single degree of freedom springs (not shown) such that it is free to move in a similar fashion only in the direction in and out of the plane of the drawing.

The magnets 16 and 18 are disposed on the center arbor 14 such that the boundaries between their north and south poles are orthogonal to one another. Thus the magnetic flux path between the magnets 16 and 18 is skewed in the soft iron rings 20 and 22 such that the flux lines are directed through opposed quarters of the assembly; i.e. through those portions at which the poles of magnets 16 and 18 are opposed. In this manner the flux fields are most favorably located relative to each of the coils 32 and 34 so the coil motion is perpendicular to the pole boundaries of the magnets 16 and 18. It will be noted that the assembly of FIG. 1 forms a single self-contained magnetic circuit and, since the total flux at any given cross-section of a magnetic circuit must be the same, the present invention completely eliminates the necessity of selecting two individual hydrophones for their identical magnetic chracteristics, i.e. providing the coils 32 and 34 have the same number of turns and the air gaps 28 and 30 are of the same dimensions the two orthogonal outputs will be matched and no further adjustment or compensation is required.

The springs 36 and 38 (affixed to coil 34) may be attached by non-magnetic screws 40 and 42 to the flux return means 24. The orthogonal pair of springs (not shown) affixed to coil 32 are similary attached to flux return means 26. The coil mounting springs 36 and 38 as well as those attached to coil 32 may be damped to prevent resonant peaks in the coil motion by known methods such as the addition of a damping layer or coating 44 of rubber cement, lead tape, or other suitable material. In order to obtain a particular damping value for the coils 32 and 34, the clearance gaps on each side of each oil may be filled with a silicone base magnetic fluid 55. Such a fluid is commercially available from the Space Systems Division of Avco Corporation, Lowell, Mass. and contains extremely small magnetic particles which tend to remain floating within a flux gradient field. The Applicant has found that such a magnetic fluid may be inserted into the air gap at the N-S boundary of one magnet and the flux gradient pulls the fluid into the gap and retains the fluid in any areas where a flux gradient exists. A silicone oil of proper centistoke and volume will thus tend to apply proper damping to the coils without the requirement for providing a physical seal to retain the damping medium in the air gaps since the magnetic force due to the flux gradient prevents the magnetic fluid from running out of the gap under the force of shock and vibration.

The two sections 10 and 12 of the hydrophone are preferably separately assembled on their respective arbor halves 14a and 14b prior to the magnetization of each of the magnets 16 and 18. After magnetization the two arbor halves with their respective components mounted may then be joined by inserting arbor half 14a into 14b and the entire hydrophone aligned such that the pole boundaries of the magnets 16 and 18 are orthogonal. The assembly is then locked together with a locking ring 46 and disposed in a case 48 formed of a high magnetic permeability material which acts both as a physical seal and as a magnetic shield to collect any flux leakage. The two halves of case 48 may be sealed by a rubber mounting 50 and the output leads 52 from coils 32 and 34 are passed through a sealing grommet 54.

The assembly of the apparatus of the present invention in two half units 10 and 12 eliminates any possible decrease in air gap flux density which tends to arise in other methods of assembly. Each half of the hydrophone, comprising one magnet, two iron rings and a coil may be placed on each half of the center arbor and each subassembly may then be individually magnetized. The two subassemblies are then mated and the hydrophone aligned merely by rotating the one half relative to the other. When the pole boundaries of the magnets are determined to be orthogonal by conventional test procedures which will be familiar to those skilled in the art, the assembly is locked together by ring 46 and inserted in its case.

Figure 1A:
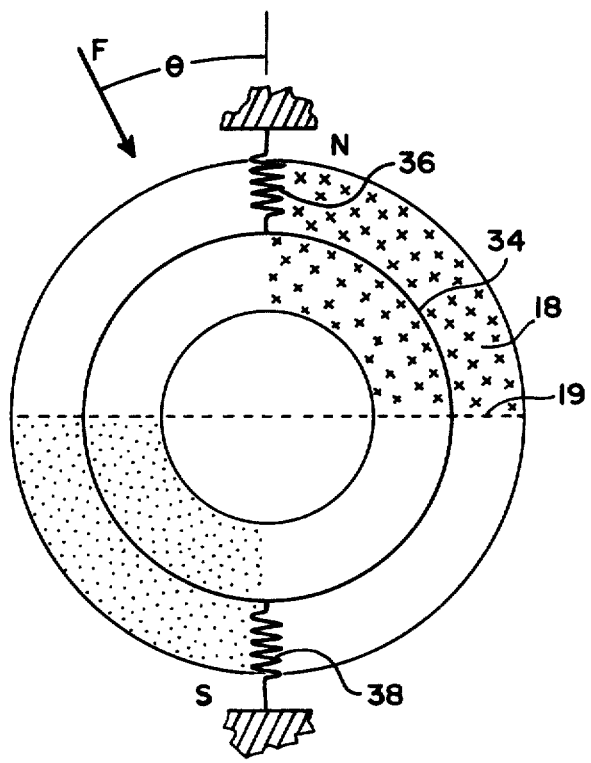
FIG. 1A is a diagram illustrating the operation of the apparatus of FIG. 1.

The manner in which the apparatus of FIG. 1 operates to resolve an impingent acoustic wave into its since component output signal is schematically illustrated in FIG. 1A. The corresponding cosine output signal will be generated by coil 32 (not illustrated) which is free to move in a direction mutually perpendicular to that of coil 34. Coil 34 is constrained by springs 36 and 38 to move only in the vertical direction which is perpendicular to the boundary line 19 between the north and south poles of the magnet 18. Thus when a force F is applied to the coil 34 at an angle $\theta$ from the axis on which the coil is free to move only that component of the force which is parallel to the axis is effective to move the coil through the flux lines of the magnet. As will be readily apparent in this illustration the effective force, $F_{eff}$, is equal to $F \cos \theta$ and the output signal from the coil is a cosine function. In the same manner the coil 32 of FIG. 1 is free to move in the direction perpendicular to that of coil 34 and produces an output signal which is a sine function of the same force, F, applied at the angle $\theta$.

Figure 2:
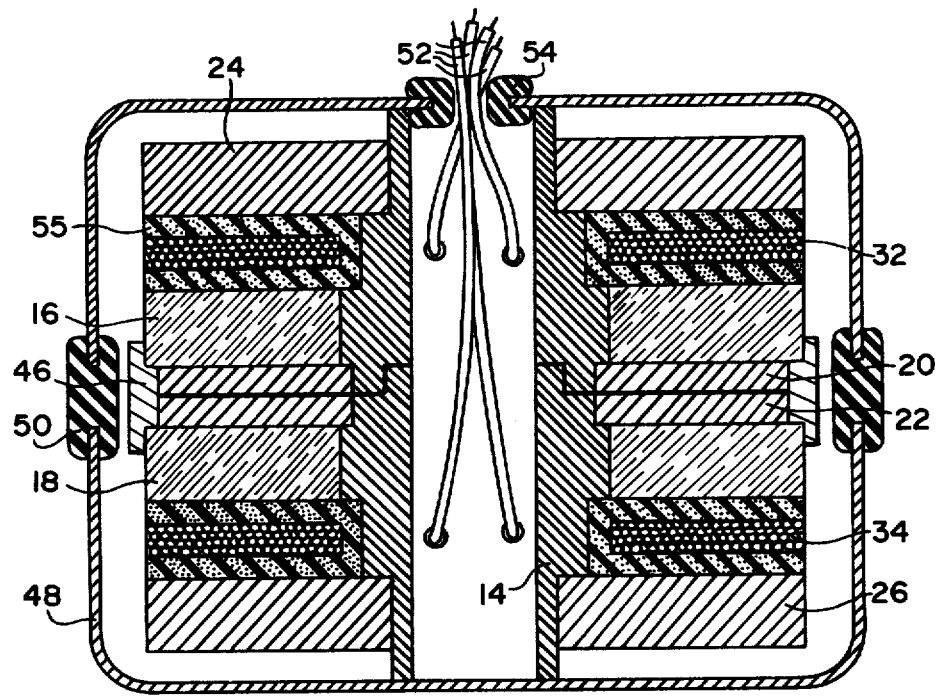
FIG. 2 is a schematic cross sectional view of another embodiment of the present invention wherein each coil has two degrees of freedom of motion.

FIG. 2 is a schematic cross section view of an alternative embodiment of the present invention wherein the requirement of coil mounting springs as shown in the apparatus of FIG. 1 is eliminated. The construction of this embodiment is basically similar to that of FIG. 1 and elements common to both embodiments are identified by like reference numerals. In this construction the coils 32 and 34, rather than being spring mounted such as to each have a single degree of freedom, are suspended in and supported by a resilient material 55 which substantially fills the air gaps between the magnets 16 and 18 and their respective flux return means 24 and 26. The coils 32 and 34 in this embodiment of the invention each have two degrees of freedom of motion; i.e. they have the freedom to move in any direction within the plane of their respective air gaps. When an acoustic wave is impingent upon the apparatus of FIG. 2 both coils 32 and 34 move parallel to each other in the direction of the applied force and in phase with each other.

Figure 2A:
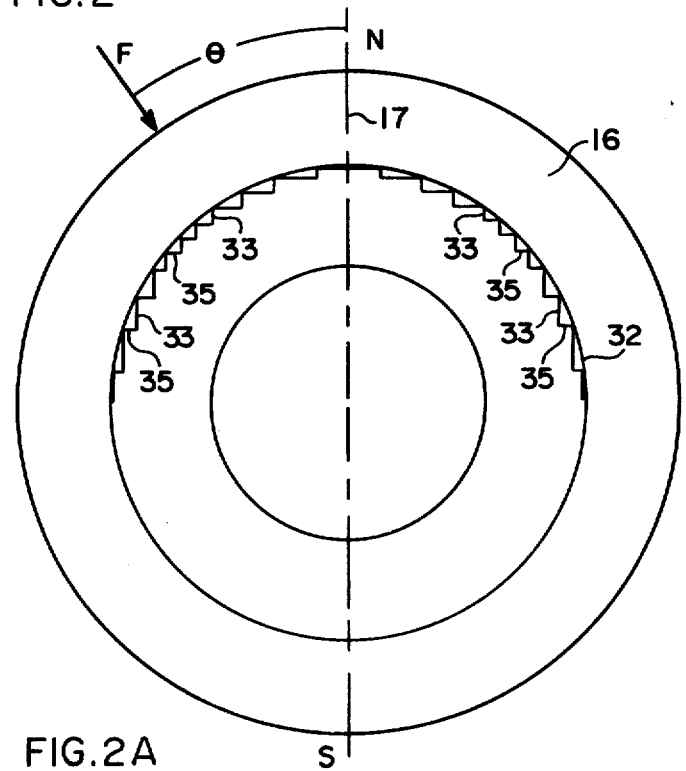
FIG. 2A is a diagram illustrating the operation of the apparatus of FIG. 2.

FIG. 2A is schematically illustrative of the manner in which the apparatus of FIG. 2 also operates to produce a sine output signal. Coil 34 (not illustrated) will produce the corresponding cosine signal in the identical manner. The length of the coil 32 may be considered as being made up of increments 33 and 35 which are respectively parallel and perpendicular to the direction in which the force, F, of an acoustic wave is applied. The parallel portions 33 of the coil length are not effective to generate a net output signal when the coil moves in the direction of the force since any voltage induced in the ring half of the coil is cancelled by a corresponding voltage of equal amplitude but opposite polarity induced in the left half. Thus, only the summation of the perpendicular portions 35 of the coil length is effective to generate a net output signal when the coil 32 moves in the direction of the applied force. When the acoustic wave is incident at an angle $\theta$ from boundary line 17 which is perpendicular to the north and south poles of magnet 16 the effective length of the coil is a function of angle $\theta$; i.e. signal generating length, $L_{eff}$, of the coil is a cosine function of the angle $\theta$. In the same manner coil 34 of FIG. 2 moves in the direction of the applied force, F, however, since the pole boundary of magnet 18 is rotated ninety degrees with respect to that of magnet 16, the effective length of coil 34 is a sine function of the angle $\theta$. It will thus be seen that, although the coil suspension provision of the apparatus of FIGS. 1 and 2 differ, the electrical outputs of both embodiments are orthogonal; i.e. sine and cosine signals which are representative of the angle of arrival of an acoustic wave impingent upon the hydrophone assembly. Although the generation of sine and cosine functions by the apparatus of FIGS. 1 and 2 is described in terms of an acoustic force moving the coil, which presupposes that al other parts are inertially stable, in actual practice it has been found by the Applicant that an acoustic wave operates to move the hydrophone assembly while the coils remains inertially stable. The results, however, are identical since it is relative motion of the coils with respect to the magnetic circuit which produces the desired output.

Figure 3:
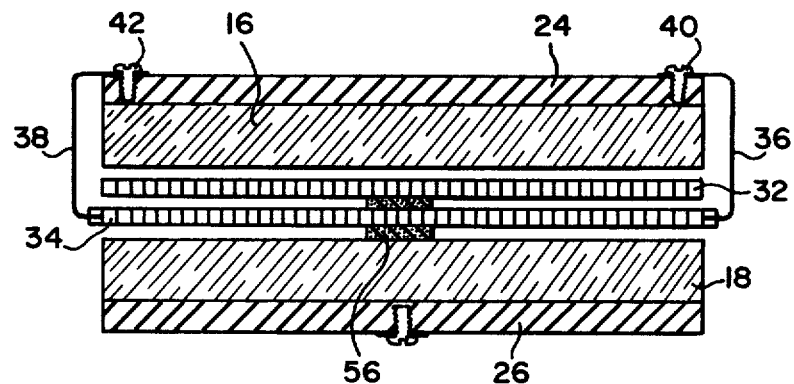
FIG. 3 is a schematic elevation view of an additional embodiment of the present invention wherein a plurality of coils are disposed in a common air gap.

With reference now to FIG. 3 there is schematically illustrated an alternative embodiment of the present invention wherein both coils are disposed in a single air gap. The hydrophone case is not shown for the purpose of clarity and elements common to the construction illustrated in FIGS. 1 and 2 are identified by like numerals. This embodiment of the invention eliminates the requirement for the central ring of high permeability material (20 and 22 of FIG. 1) and thus provides a reduction in the overall weight of the finished hydrophone. The orthogonal motions of coils 32 and 34 with respect to one another in this embodiment, however, are at an angle of 45 degrees to the pole boundaries of magnets 16 and 18 since the magnetic flux path between the magnets may not be skewed in the manner described with reference to FIGS. 1 and 2. Although this configuration provides orthogonal i.e. sine and cosine output signals which are only half the amplitude of those produced by the apparatus of FIGS. 1 and 2 due to the fact that the effective signal generating length of coils 32 and 34 is only one half that of FIGS. 1 and 2, this embodiment of the invention is of significant value in applications wherein size and weight rather than output signal strength are of primary concern.

Figure 4:
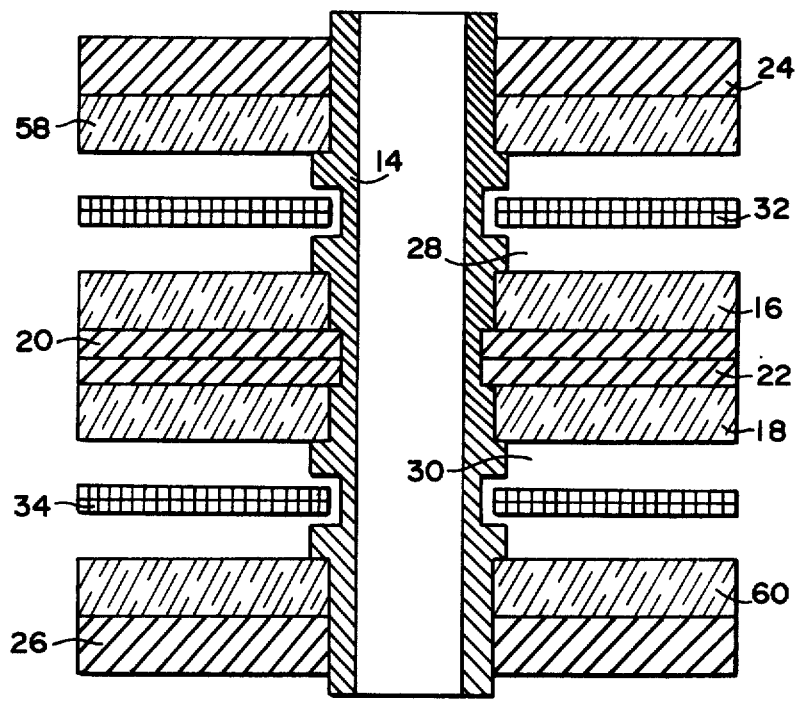
FIG. 4 is a schematic cross sectional view of an alternative configuration of apparatus constructed in accordance with the principles of the present invention.

FIG. 4 illustrates an alternative configuration of a hydrophone fabricated in accordance with the principles of the present invention and wherein elements common to the embodiments illustrated in FIGS. 1 and 2 are identified by like reference characters. Again, the hydrophone case is not shown for purposes of clarity nor is the coil suspension means illustrated since the suspension construction shown in FIGS. 1 and 2 are equally applicable to the apparatus of FIG. 4. By adding additional ring magnets 58 and 60 the magnetic flux density in the air gaps 28 and 30 is increased proportionately. Thus motion of the coils 32 and 34 due to the force of an acoustic wave results in the cutting of more magnetic flux lines per unit area. A higher voltage is thereby induced in the coils and overall hydrophone sensitivity is improved.

Figure 5:
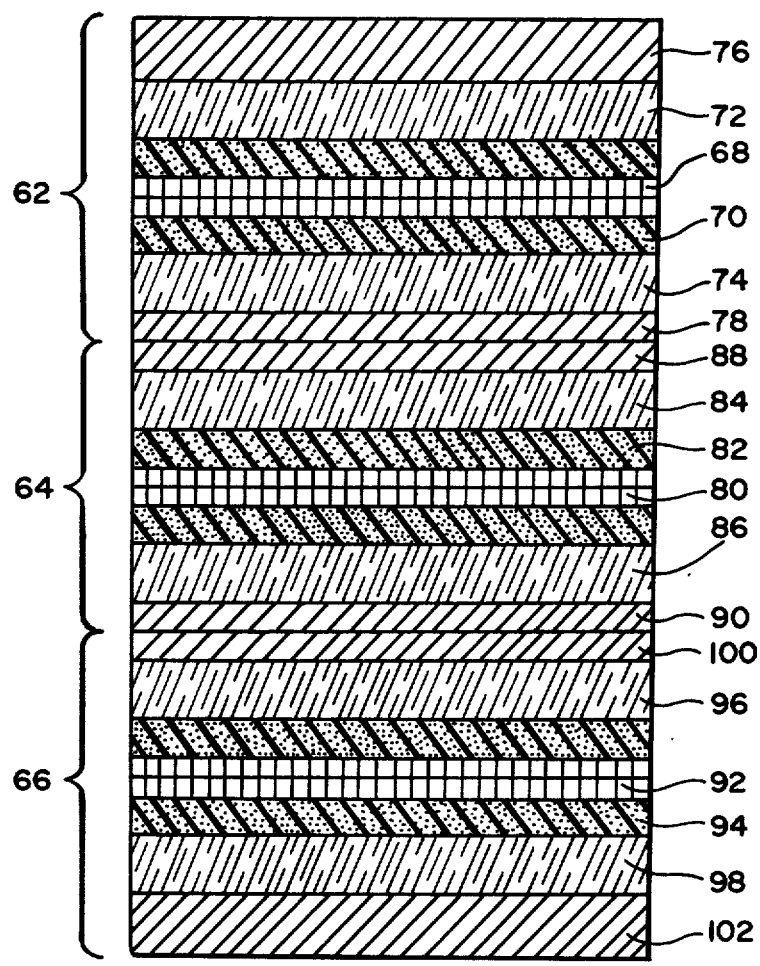
FIG. 5 is a schematic elevation view of a three coil hydrophone fabricated in accordance with the principles of the present invention.

Although the foregoing discussion has been directed to two coil hydrophones which produce two orthogonal output signals representative of the relative direction from which an acoustic wave is incident on the assembly the principles of the present invention may also be applied to the construction of directional hydrophones having three or more coils disposed in a self-contained magnetic circuit. Such an embodiment is illustrated in the schematic elevation view of a three coil hydrophone shown in FIG. 5. Once again neither the hydrophone case nor the coil suspension means are specifically illustrated for the purposes of clarity.

This embodiment of the invention may be fabricated in three identical subassemblies or modules 62, 64 and 66 such that assembly of the completed hydrophone is facilitated in the manner described above with reference to FIG. 1. The subassembly 62 comprises a first coil 68 disposed in a first air gap 70 between first and second axially magnetized, ring type, ceramic magnets 72 and 74. The magnet 72 has associated therewith a first flux return means 76 such as an annulus of soft iron. Disposed adjacent magnet 74 is a first ring 78 of soft iron wherein magnetic flux may undergo a change in direction. The magnets 72 and 74 are disposed one one each side of the air gap 70 and have their magnetic poles opposed; i.e. the pole boundaries of the magnets are parallel to one another and perpendicular to the direction in which 20 the spring suspended coil motion will produce a maximum electrical output signal. This direction of coil motion for subassembly 62 is denoted zero (0) degrees for illustrative purposes. The subassembly 64 comprises a second coil 80 disposed in a second air gap 82 between third and fourth axially magnetized, ring type, ceramic magnets 84 and 86. The magnets have associated therewith second and third soft iron rings 88 and 90 respectively. The magnetic poles of magnets 84 and 86 and their parallel pole boundaries are disposed at an angle of 60 degrees with respect to the magnets 74 and 76. The magnetic flux path between magnet 74 and magnet 84 is skewed by 60 degrees in the iron rings 78 and 88 such that motion of coil 80 perpendicular to the parallel pole boundaries of magnets 84 and 86; i.e. at 60 degrees produces a maximum electrical output signal.

The third subassembly 66 is physically the same as subassembly 62 but is inverted with respect thereto. A third coil 92 is disposed in a third air gap 94 between fifth and sixth axially magnetized, ring type, ceramic magnets 96 and 98. A soft iron ring 100 is associated with magnet 96 and together with ring 90 of subassembly 64 provides a means wherein the magnetic flux between magnets 86 and 96 may undergo a change in direction. The magnetic poles of magnets 96 and 98 are again opposed to one another and the parallel pole boundaries thereof are disposed at an angle of 60 degrees with respect to magnets 84 and 86 and 120 degrees with respect to magnets 74 and 76. The magnet 98 is adjacent a second flux return means 102. The direction of motion of coil 92 which produces the maximum electrical output signal is thus at 120 degrees. It will thus be seen that the present invention provides a three direction hydrophone in a self-contained magnetic circuit and in which an acoustic wave is resolved into three electrical signals of a phase which is 60 degrees from one another. It will further be apparent that the pole boundaries may be skewed 120 degrees from one another to thereby provide a conventional three phase electrical output signal and that the coils illustrated in FIG. 5 may alternatively be suspended in their respective air gaps such that each coil has a single degree of freedom of motion as described with reference to FIG. 1.

Figure 6A:
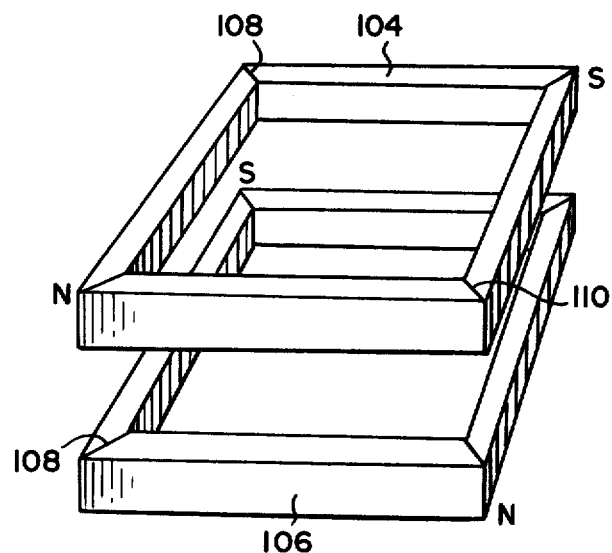
FIGS. 6A and 6B schematically illustrate alternative configurations of magnets useful in the practice of the present invention.
Figure 6B:
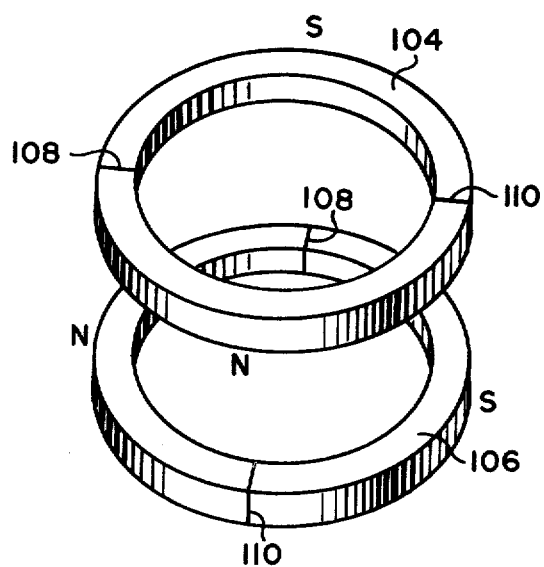

It will further be apparent that the apparatus of the present invention may assume a variety of horizontal cross section configurations. FIGS. 6A and 6B illustrate square and round configurations respectively in which the magnets, coils and flux paths may be fabricated. In particular, magnets 104 and 106 are shown and illustrate the orientation of the magnetic N and S poles and pole boundaries 108 and 110. In the square magnet embodiment of FIG. 6A the coil motion will be along the diagonal of the squares and thus normal to the pole boundaries 108 and 110. Since the length of a square wire disposed within a circular boundary is less than the circular boundary itself, a square coil will generate more signal per unit length since both the square and circular coil have the same effective signal generating length perpendicular to the direction of coil motion. However, if a square coil were located in a restricted circular container as is generally the case with sonobuoys the square coil will have less width, thus contain fewer turns and produce less electrical output signal than a round coil in the same restricted circuit container. Square coils are, furthermore, more difficult to wind in that the process is more time consuming. This is due to the fact that in high speed coil winding the turns tend to bulge at the corners and assume a circular form which decreases the efficiency of the square configuration. The use of the round configuration for the apparatus of the present invention is thus generally preferred, however, the invention is not to be construed as limited to such a configuration.

FIG. 7 illustrates a plan view of the present invention with sections removed thereby revealing the general arrangement of the elements and wherein elements common to the embodiments described hereinbefore in the specification are identified by like reference characters. A section of case 48 is cutaway illustrating the uppermost section of the center arbor 14, mounting spring 38 and the fastening device 40 securing the spring to the flux return means 24, and a segment of each of coils 32 and 34.

It will thus be seen that the objectives set forth hereinabove, among those made apparent from the preceding description are efficiently attained and, since other embodiments will occur to those skilled in the art, it is intended that all matter contained in the above description or shown in the appended drawings shall be interpreted as illustrative and not in a limiting sense.

Having described what is new and novel and desired to secure by Letters Patent, what is claimed is:

1. A directional hydrophone having a first and second coil assembly which interact with a substantially constant magnetic field in a magnetic circuit so as to produce electrical signals in response to external sound pressure waves, said electrical signals being a function of the direction of sound wave propagation whereby said signals will provide directional information when processed by signal processing equipment;

said magnetic circuit comprises at least a first and second magnet for providing said magnetic field with each of said magnets being positioned along a common axis, and in planes substantially perpendicular to said common axis, said magnetic field being substantially parallel to said common axis;

at least a first and second magnetic flux return path means positioned along said common axis, said magnets and said flux return means being arranged to provide first and second air gaps in said magnetic circuit, each of said first and second air gaps being in planes substantially perpendicular to said common axis; and means for supportably mounting said first and second coil assemblies in said first and second air gaps respectively for motion in two directions in said magnetic field whereby an electrical signal is generated in each of said coil assemblies capable of being detected by said processing equipment.

2. The hydrophone as set forth in claim 1 wherein said first and second coil assemblies are movable in different ones of said two directions.

3. The hydrophone as set forth in claim 2 wherein said two directions of motion are mutually perpendicular.

4. The hydrophone as set forth in claim 1 wherein said first and second magnets are substantially circular in shape with each having magnetic pole boundaries, said magnets being positioned with said pole boundaries having a predetermined angular orientation.

5. The hydrophone as set forth in claim 4 wherein said magnetic circuit further includes a layer of magnetic material disposed between and in contact with adjacent surfaces of said magnets wherein said magnetic flux may undergo a change in direction.

6. The hydrophone as set forth in claim 5 wherein said magnetic boundaries of said first and second magnets are substantially orthogonal, and said magnetic flux is directed through opposed quarters of said layer of magnetic material.

7. The hydrophone as set forth in claim 6 wherein said coil assemblies are moveable in different ones of said two directions.

8. The hydrophone as set forth in claim 7 wherein said first and second coil assemblies are moveable substantially perpendicular to the pole boundaries of said first and second magnets, respectively.

9. A bi-directional transducer having a first and second coil assembly positioned in a substantially constant magnetic field in a magnetic circuit so as to produce a first and second electrical signals in response to external sound pressure waves said electrical signals being a function of the direction of the source of the sound pressure waves whereby said electrical signals will provide directional information when processed through signal processing equipment, said magnetic circuit comprises;

a first and second circular magnets each having two substantially parallel radial surfaces, said magnets being positioned in substantially parallel planes along a common axis, each of said magnets having magnetic pole boundaries, and means for positioning said magnets adjacent to each other with said pole boundaries having a predetermined angular orientation;

a layer of magnetic material position in juxtaposition with adjacent parallel surfaces of said first and second magnets, wherein said magnetic flux may undergo a change in direction;

a first and second magnetic flux return path means, one of said flux return means being positioned adjacent one of said magnets and the other of said flux return means being adjacent the other of said magnets, all being positioned along said common axis, said first flux return means and adjacent circuit magnet being arranged to provide said first air gap and said second flux return means and adjacent circular magnet being arranged to provide said second air gap, said first and second magnets providing a magnetic field in each of said air gaps, said magnetic field being substantially parallel to said common axis; and means for positioning said first and second coil assemblies in said first and second air gaps respectively, each of said coil assemblies having freedom of motion substantially perpendicular to said magnetic field in at least two directions in response to sound waves.

10. A transducer as set forth in claim 9 wherein said first and second coil assemblies are moveable in different ones of said two directions.

11. A transducer as set forth in claim 10 wherein said two directions of motion are mutually perpendicular.

12. The transducer as set forth in claim 9 wherein said magnetic boundaries of said first and second magnets are orientated substantially perpendicular to one another.

13. The transducer as set forth in claim 11 wherein said magnetic flux is directed through said opposed quarters of said layer of magnetic material positioned between said first and second magnets.

14. The transducer as set forth in claim 12 wherein said first and second coil assemblies are each moveable in a direction substantially perpendicular to the pole boundaries of said adjacent magnet.

* * * * *